Dec. 28, 1965   D. G. TILLINGHAST ETAL   3,225,871
RAIL MOUNT
Filed Dec. 10, 1962   2 Sheets-Sheet 2

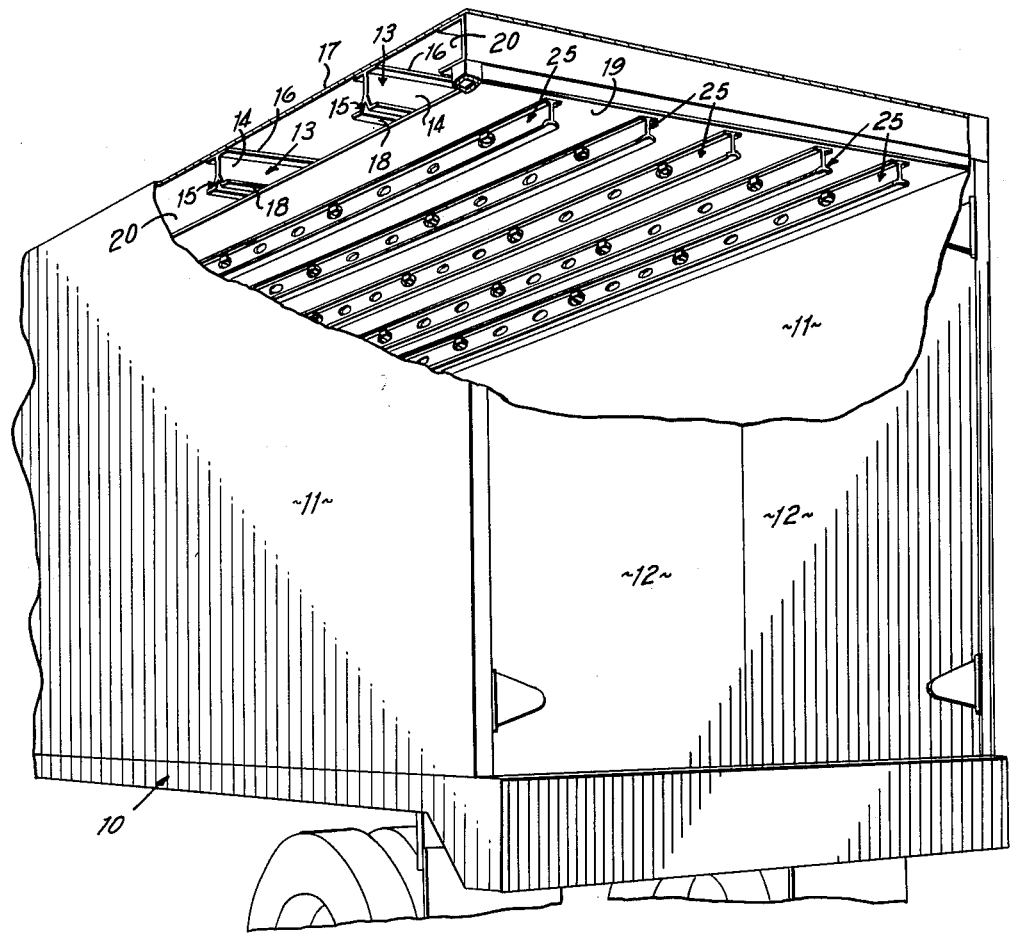
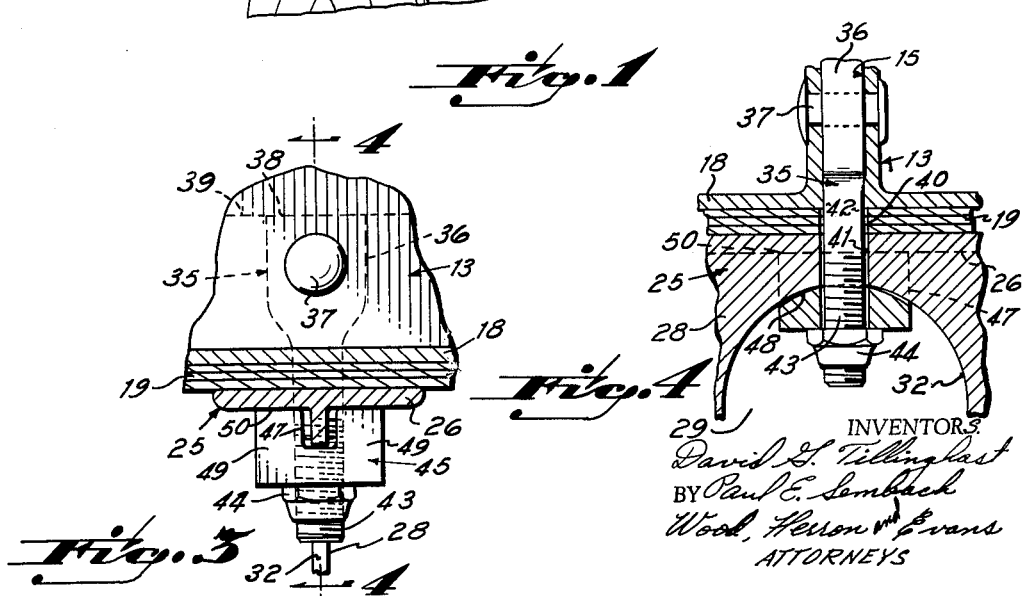

INVENTORS.
David G. Tillinghast
BY Paul E. Sembach
Wood, Herron & Evans
ATTORNEYS

United States Patent Office 3,225,871
Patented Dec. 28, 1965

3,225,871
RAIL MOUNT
David G. Tillinghast, Cincinnati, Ohio, and Paul E. Sembach, Longview, Tex., assignors to Trailmobile Inc., Cincinnati, Ohio, a corporation of Delaware
Filed Dec. 10, 1962, Ser. No. 243,302
4 Claims. (Cl. 189—36)

This invention to rail mount and more particularly the invention is directed to a structure by which horizontal meat supporting rails are mounted to roof structure of a refrigerated cargo body. The invention is directed to improvements in the structure disclosed in Patent No. 2,833,588.

As disclosed in our earlier patent, the long distance hauling of meat requires an insulated, refrigerated cargo body in which meat sections such as hind quarters and fore quarters of beef or the like are suspended from the roof of the cargo body. The support for the meat sections is constituted by a plurality of rails which are parallel to and spaced from each other, the rails extending longitudinally from the front of the cargo body to its rear door. The rails are preferably I beams having apertures formed in their central webs, the apertures being spaced along the length of the rails. The apertures receive the upper ends of S-shaped meat hangers whose lower ends are hooked into the meat sections.

The lower flange of each rail may be used to support the rollers of a conveyer trolley which is used to convey a heavy meat section, attached to a hanger, from the rear door to the forward end of the cargo body. After a meat section has been conveyed to a proper location in the cargo body, the hanger is inserted in an aperture in the meat rail. Each meat section is quite heavy and the combined weight of all sections on a particular rail is such as to require the rail to be attached securely to the roof structure of the cargo body.

The roof structure of the cargo body to which the meat rails are attached comprises a series of spaced transverse beams, called roof bows, which are supported at their ends on the side walls of the cargo body. A roof panel of plywood or the like is supported on the lower surfaces of the roof bows. A roof sheet is attached to the upper surfaces of the roof bows and insulating material is deposited between the panel and the roof sheet.

In attaching the meat rails to the roof structure, it has been the practice to secure, to the roof bow, two downwardly depending studs at each place where a roof bow crosses over a meat rail. In the structure disclosed in the patent, these studs pass through holes formed in the meat rail flanges and the rails are secured to the studs by nuts threads on the ends of the studs. In an improved construction, the requirement of drilling two holes in the meat rail flanges is eliminated by providing a clamping member which passes through an aperture in the web of the meat rail and straddles the upper flange of the meat rail. The studs are secured to the ends of the clamp by nuts threaded on the ends of the studs. In the earlier construction as well as in the improved clamp structure, it is necessary to secure two studs to the cross bow at each attaching location, and it is necessary to form two holes in the plywood roof panel as well as applying two nuts to the depending studs in order to secure the clamp and meat rail to the roof bow. When this structure is multiplied by the number of meat rails in a given cargo body as well as by the number of crossover locations on each meat rail, the number of studs to attach, holes to drill and nuts to turn becomes quite considerable and is an appreciable cost factor in the manufacture of cargo bodies.

It has been an objective of the invention to simplify the structure by which meat rails are attached to the cargo body roof bows, and thereby to reduce the time and consequent cost of assembly. More specifically, it has been an objective of the invention to provide a single stud attachment to be employed at each attaching location. The invention further contemplates the provision of a clamping washer cooperation with the single stud, the clamping washer being configurated to firmly engage the meat rail in the aperture without obstructing the passage of meat hooks through the aperture. The shape of the clamping washer is also important to the extent that it is able to apply a clamping force over a substantial area to avoid localized stress concentration.

The combined effects of an easily applied clamping washer, and the single stud support greatly reduces the time and consequently the cost of installing the meat rails. For example, in a cargo body twenty feet long having six to eight longitudinally extending meat rails, over one hundred studs can be eliminated through the use of the single stud rail mount of the present invention.

The several objectives of the invention will become more readily apparent from the following detailed description taken in conjunction with the accompanying drawings in which:

FIG. 1 is a perspective view of a cargo body employing the invention,

FIG. 3 is a cross-sectional view taken along lines 3—3 of FIG. 2, and FIG. 4 is a cross-sectional view taken along lines 4—4 of FIG. 3.

Figure 2:
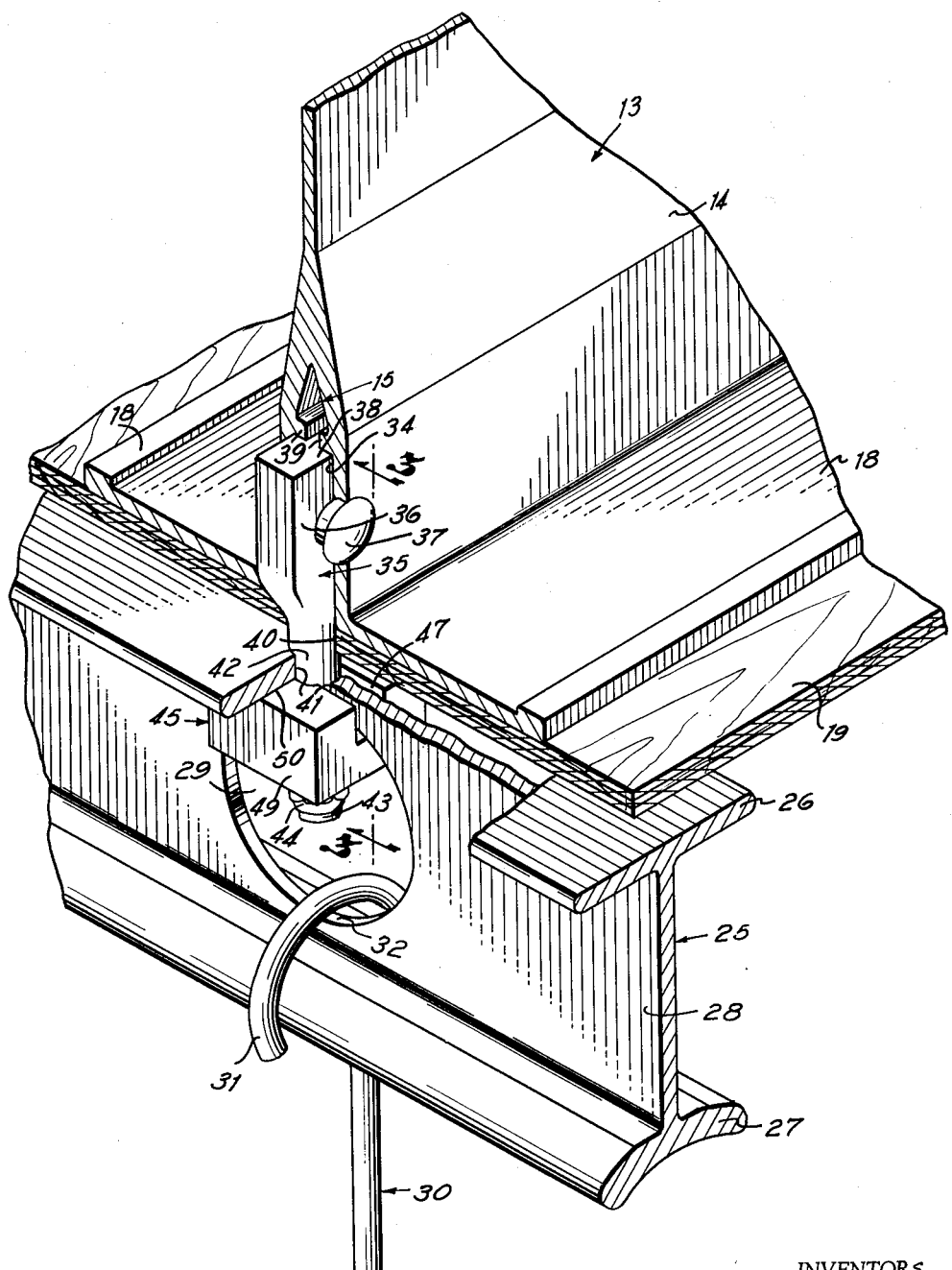
FIG. 2 is a fragmentary perspective view illustrating the elements of the combination.

Referring to FIG. 1, a vehicle cargo body 10 is shown with the upper portion broken away to illustrate the relationship of the structural components. The cargo body has side walls 11 and a pair of hinged doors 12 at the rear end thereof through which access is had to the interior of the cargo body.

The side walls support transverse cross bows 13 which are spaced along the length of the cargo body. The cross bows are preferably aluminum extrusions which are generally of an I beam configuration having a central web 14, the lower portion of which is split as at 15. The cross bows have upper flanges 16 which support a roof sheet 17 and lower flanges 18 which support a panel 19 of plywood or the like. The cross bows 13 provide a space 20 between the roof sheet 17 and the panel 19 into which an insulative material is introduced to give the roof the necessary heat insulating quality.

Attached to the roof of the cargo body are a series of longitudinally extending meat rails 25 which are also preferably aluminum extrusions. Each meat rail has an upper flange 26 which engages the roof panel 19 and a lower flange 27, the flanges being spaced apart by a central web 28. The central web has a plurality of longitudinally spaced apertures 29 through which the ends of meat hangers may pass. The lower flange 27 is curved in such a manner that its surface defines a circle which passes through the lower extremity of the apertures 29. As illustrated in FIG. 2, a meat hanger 30 has its upper end portion 31 circularly curved and having the same inside radius as the circle defined by the lower flange 27. Thus, when the meat hook is passed through the aperture 29 the weight on the meat hook is supported by the curved surfaces of the lower flange 27 and by the lowest extremity of the wall 32 which forms aperture 29.

The single stud structure for securing the meat rail to a cross bow at each attaching location is illustrated in FIGS. 2, 3 and 4. The cross bow web has its lower portion split or bifurcated as described above to provide a channel 34 extending along its length. A stud 35 having a rectangularly shaped upper end 36 is inserted into the channel and secured there by a rivet 37. The upper end 38 of the stud bears against shoulders 39 in the upper end of the channel 34 to prevent the stud from twisting or pivoting with respect to the cross bow.

At each attaching location a hole 40 is formed in the panel 19 and a hole 41 is formed in the upper flange 26 and a portion of the web 28 of the meat rail, the hole 41 extending to the aperture 29. The stud 35 has a downwardly extending cylindrical portion 42 which has threads 43 at its lower end to receive a nut 44. The nut 44 bears against a U-shaped clamping washer 45 which in turn bears against the meat rail 25 to secure it to the cross bow 13.

The clamping washer has a slot 47 which is bottomed at its bight portion by a curved surface 48 having a radius substantially identical to the radius of the aperture 29. The curved bottom surface of the washer engages the wall 32 of the aperture and bears against it when the nut 44 is tightly secured on the stud 35.

The slot 47 splits the washer into two legs 49. The legs 49 have flat surfaces 50 which bear against the upper flange 26 of the meat rail when the curved bottom surface 48 is in engagement with the aperture wall 32. The combination of the surfaces 48 and 50 bearing against the meat rail provide a very secure clamp over a substantial area of the meat rail and thus avoids any localized stress concentration.

In the operation of the invention, the studs 35 are riveted to the cross bows at preselected positions. The panel 19 is secured to the cross bows with the studs projecting through the holes 40. The meat rails are then held with their upper flanges 26 against the panel 19 with the studs projecting through holes 41 and into the apertures 29. Clamping washers 45 and nuts 44 are applied to the respective studs and tightened with automatic wrenches to complete the installation.

Having described our invention, we claim:
1. A rail mount comprising,
an upper rail having a depending stud,
a lower rail crossing said upper rail and having an upper flange integral with a vertical web,
said web having at least one transverse aperture therethrough,
said lower rail having a vertical hole passing from said aperture to the upper surface of said flange,
a U-shaped washer having a bight portion passing through said aperture and having a leg engaging the surface of said flange on each side of said hole, said washer having a hole in alignment with said flange hole,
said stud passing through said flange and washer holes, and
a nut threaded on the end of said stud.

2. A rail mount comprising,
an upper rail having a depending stud,
a lower rail crossing said upper rail and having an upper flange integral with a vertical web,
said web having at least one circular aperture therethrough,
said lower rail having a vertical hole passing from said aperture to the upper surface of said flange,
a U-shaped washer having a curved bight portion engaging the circular wall of said aperture and having a leg engaging the surface of said flange on each side of said hole, said washer having a hole in alignment with said flange hole,
said stud passing through said flange and washer holes, and
a nut threaded on the end of said stud.

3. A rail mount comprising,
a member having a stud projecting therefrom,
a rail having an upper flange in engagement with said member and having a perpendicular web integral therewith,
said web having a transverse aperture,
said flange having a hole through which said stud passes,
a U-shaped washer having a bight portion passing through said aperture and having a leg engaging the surface of said flange on each side of said hole, said washer having a hole in alignment with said flange hole,
said stud passing through the hole in said washer, and
a nut threaded on the end of said bolt.

4. A rail mount comprising,
a member having a stud projecting therefrom,
a rail having an upper flange in engagement with said member and having a perpendicular web integral therewith,
said web having a transverse aperture spaced from said flange,
said rail having a pole passing from said aperture to the upper surface of said flange,
a U-shaped washer having a bight portion engaging said aperture wall and having a leg engaging the surface of said flange on each side of said hole, said washer having a hole in alignment with said flange hole,
said stud passing through the hole in said washer, and
a nut threaded on the end of said bolt.

References Cited by the Examiner
UNITED STATES PATENTS
2,833,588  5/1958  Black _____ 296—28

FOREIGN PATENTS
895,749  4/1944  France.

FRANK L. ABBOTT, *Primary Examiner.*
RICHARD W. COOKE, *Examiner.*

UNITED STATES PATENT OFFICE
CERTIFICATE OF CORRECTION

Patent No. 3,225,871　　　　　　　　　　　　　　December 28, 1965

David G. Tillinghast et al.

It is hereby certified that error appears in the above numbered patent requiring correction and that the said Letters Patent should read as corrected below.

Column 1, line 9, for "invention to rail" read -- invention relates to a rail --; column 4, line 37, for "pole" read -- hole --.

Signed and sealed this 10th day of January 1967.

(SEAL)
Attest:

ERNEST W. SWIDER
Attesting Officer

EDWARD J. BRENNER
Commissioner of Patents